J. M. MILLER.
VEHICLE WHEEL.
APPLICATION FILED MAY 4, 1921.
1,436,046.
Patented Nov. 21, 1922.
2 SHEETS—SHEET 2.
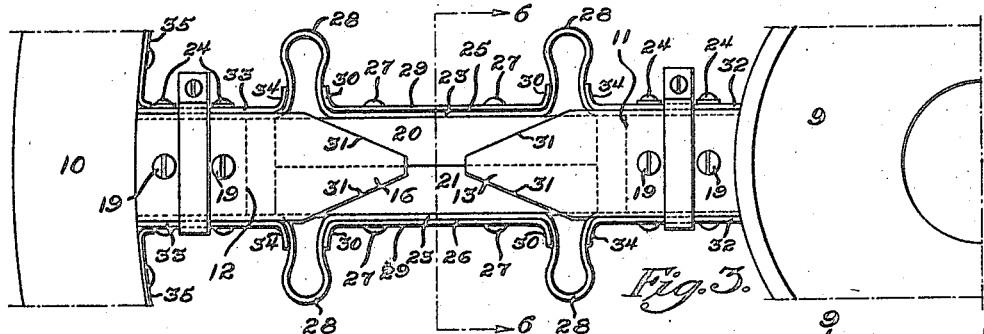
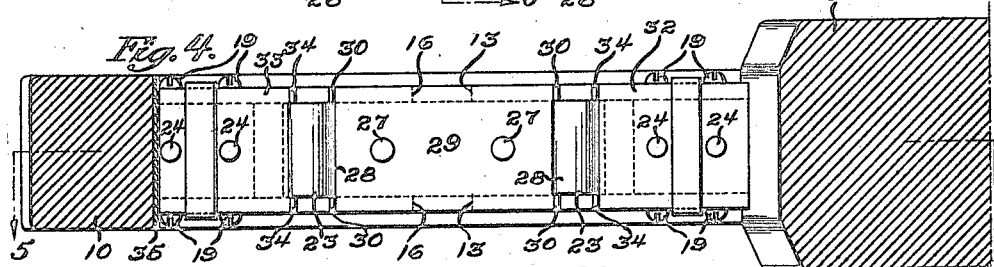
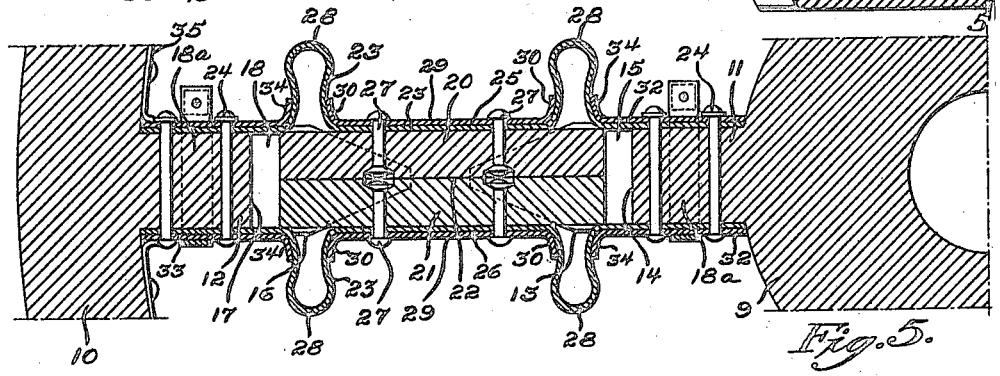
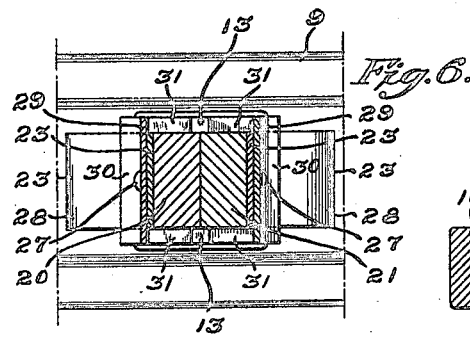
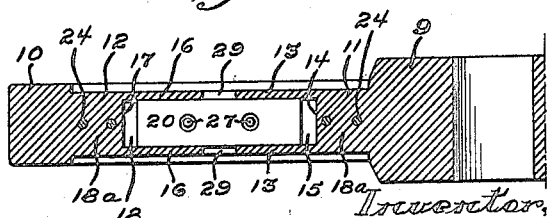

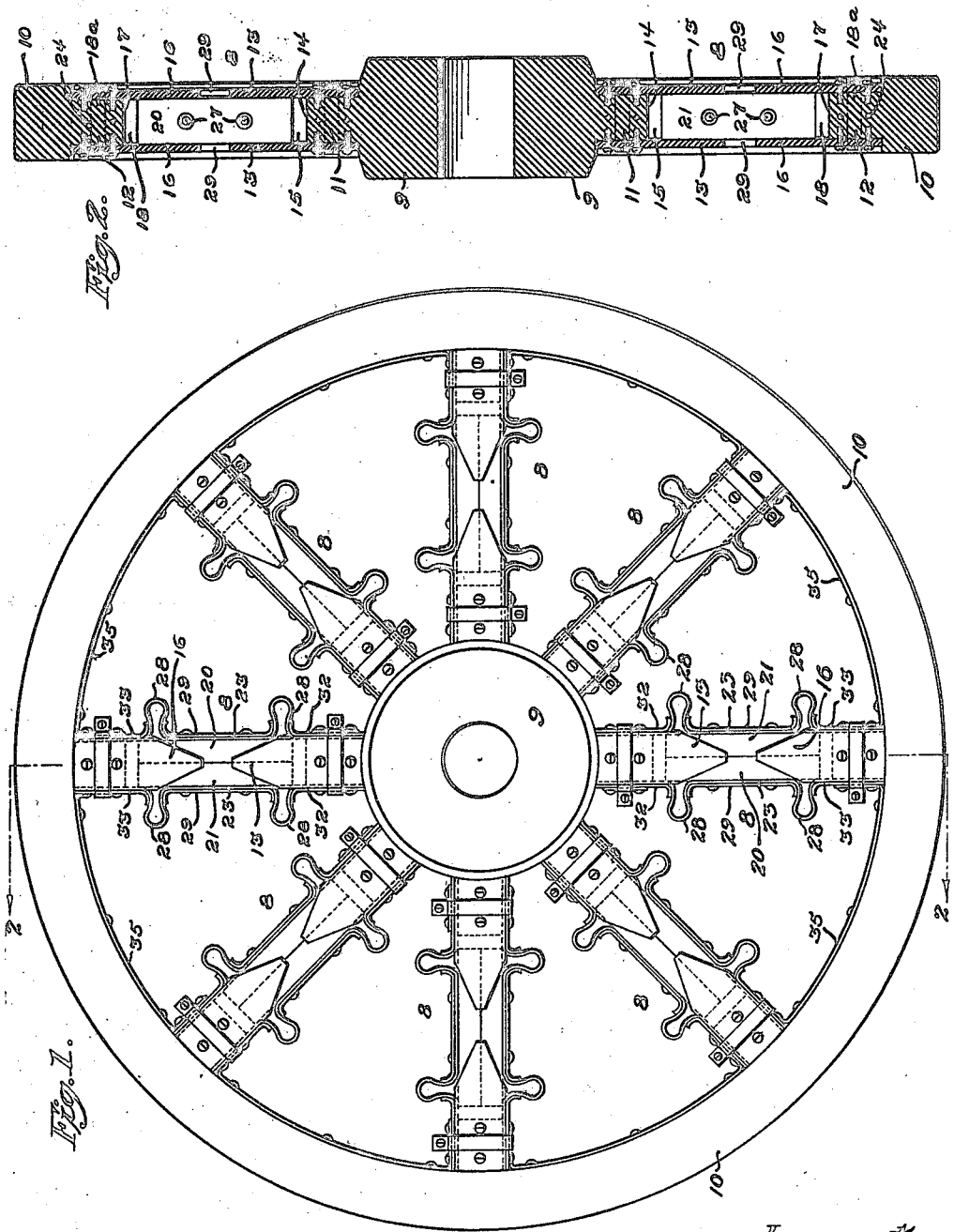

Patented Nov. 21, 1922.

1,436,046

UNITED STATES PATENT OFFICE.

JAMES M. MILLER, OF ROSEMONT, PENNSYLVANIA.

VEHICLE WHEEL.

Application filed May 4, 1921. Serial No. 466,280.

*To all whom it may concern:*

Be it known that I, JAMES M. MILLER, a citizen of the United States, residing at Rosemont, in the county of Montgomery and State of Pennsylvania, have invented certain new and useful Improvements in Vehicle Wheels, of which the following is a specification.

One object of my invention is to do away with the necessity of employing pneumatic rubber tires on vehicles and thus eliminate trouble and expense caused by punctures, blow-outs and frequent changing and replacement of tires as is necessary when rubber tires are used.

Another object is to provide an improved resilient vehicle wheel of durable and strong construction which will readily absorb the shocks caused by the movement of the vehicle over a roadway and which will not require a rubber or other resilient tire.

These objects, and other advantageous ends which will be described hereinafter, I attain in the following manner, reference being had to the accompanying drawings in which—

Figure 1 is a side elevation showing a wheel made in accordance with my invention, Figure 2 is a section taken on the line 2—2 of Figure 1, Figure 3 is an enlarged fragmentary side view of one of the spokes illustrating its connection to the hub and rim, Figure 4 is a top plan view of Figure 3, Figure 5 is a section taken on the line 5—5 of Figure 4, Figure 6 is a transverse section taken on the line 6—6 of Figure 3, and Figure 7 is a fragmentary section of the same general character as shown in Figure 2 with certain of the parts made integral.

Referring to the drawings, my improved wheel includes a number of spokes 8 interposed between the hub 9 and rim 10.

Since all the spokes and their connections with the rim are preferably made of the same construction, it will be necessary to describe the construction of only one of said spokes.

Each of said spokes includes two opposed lugs 11 and 12 which are connected respectively to the hub 9 and rim 10 and if desired, as illustrated, these lugs may be made integral respectively with the hub and rim.

The lug 11 has two guard tongues 13 at its sides which project outwardly beyond the surface 14 so as to provide a space 15 between the inner side surfaces of the tongues and outward from the surface 14. The tongues 13 have outwardly tapering ends as clearly shown in Figures 1, 3 and 5 for a purpose hereinafter described.

The lug 12 at its sides has guard tongues 16 which project inwardly beyond its surface 17 to provide a space 18 between the tongues; said tongues tapering as illustrated so that the pointed ends of the guards 13 and 16 oppose each other on each side. These guards may either be made separate pieces forming parts of the respective lugs and secured to the intermediate portions 18ª of the lugs by screws or other suitable devices as shown at 19, or they may be made integral with the other portions of the lugs as shown in Figure 7.

Two strong and inflexible filling pieces 20 and 21, which are preferably made of elongated rectangular shape, slidably engage each other with the division 22 therebetween preferably formed in a plane including the axis of the hub when the wheel is in its normal position as clearly shown in Figures 3 and 5. These filling pieces are preferably made of the same length, as illustrated, and if desired may be made of steel.

Two strip springs 23, which may be made of strips of spring steel, are arranged at the top and bottom of the lugs; the ends of said springs being respectively secured to the top and bottom of said lugs preferably by rivets 24. These strip springs have parallel intermediate portions 25 and 26 which are respectively secured to the filler pieces 20 and 21 by rivets or other securing devices 27. Between the intermediate portions 25 and 26 of the springs 23 and the lugs 11 and 12, said springs are bent to provide loops 28. The ends of the filler pieces are normally spaced from the surfaces 14 and 17 of the lugs 11 and 12 so that if the hub 9 moves toward the rim 10 in line with the spoke, the spaces between said filler pieces and the lugs will be decreased and the loops 28 of the springs 23 will be compressed. Thus the springs 23 form weight-sustaining resilient members as clearly shown in Figure 1 when the spokes are under the hub 9.

Strip springs 29 are secured to the outer faces of the intermediate portions 25 and

26 of the springs 23 by the securing devices 27; said springs 29 serving as guard springs and having bent end portions 30 in engagement with the side surfaces of the loops 28. The springs 29 are of greater width than the springs 23 and are adapted to be engaged by the edge surfaces 31 of the tongues 13 and 16 for the purpose of resiliently resisting a sudden rotative power applied to the hub such for example as the driving action at the hub when used on an automobile or other motor driven vehicle. Thus the spokes will resiliently absorb shocks due to the weight of a vehicle imposed upon the hub and will also absorb shocks due to the rotative movement of the hub relatively to the rim.

As a means for strengthening the loops 28 at positions adjacent the hub and rim, I preferably provide auxiliary strip springs 32 and 33 which may be respectively secured to the lugs 11 and 12 by the securing device 24 as clearly illustrated in Figure 5. These auxiliary springs 32 and 33 preferably have bent portions 34 for engagement with the opposite sides of the loops 28 of the springs 23 so that the inner portions of said loops 28 are mounted between the parts 30 and 34 of the guard springs 29 and auxiliary springs 32 and 33. It will be noted that by providing the filler pieces 20 or 21 between the rigid and inflexible tongues 13 and 16 that the spoke cannot bend laterally or sidewise but the construction is such that the springs 23 on each side of the spoke can flex at their loops independently of each other; the filler pieces merely sliding on each other to permit said independent flexing.

If desired the inner surface of the rim may be provided with sectional strip springs 35 between the spokes to add to the strength of the auxiliary springs.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A resilient wheel having spokes interposed between the hub and the rim, said spokes including opposed lugs secured to said hub and rim; springs spaced apart and connected between the lugs of said spokes, said springs having loops formed within their lengths; and filler pieces secured to said springs; substantially as described.

2. A resilient wheel having spokes interposed between the hub and the rim, said spokes including opposed lugs secured to said hub and rim; springs spaced apart and having loops formed within their lengths between the lugs of the spokes; and filler pieces secured to said springs between said loops and movable lengthwise independently of each other; substantially as described.

3. A resilient wheel having spokes interposed between the hub and the rim, said spokes including opposed lugs secured to said hub and rim; and resilient means including guard springs spaced apart and in connection between said lugs, said lugs having guard tongues adapted to move into contact with said guard spring when said resilient means flexes due to relative movement between the hub and the rim; substantially as described.

4. A resilient wheel having spokes interposed between the hub and the rim, said spokes including opposed lugs secured to said hub and rim; springs spaced apart in connection between said lugs and having loops formed within their lengths; filler pieces secured to the springs; and guard springs between said loops, said lugs having guard tongues at the side of said filler pieces and adapted to engage said guard springs; substantially as described.

5. A resilient wheel having spokes interposed between the hub and the rim, said spokes including opposed lugs secured to said hub and rim; springs spaced apart in connection between said lugs and having loops formed within their lengths; and guard springs between said loops and having bent portions for engagement with said loops; substantially as described.

6. A resilient wheel having spokes interposed between the hub and the rim, said spokes including opposed lugs secured to said hub and rim; springs spaced apart in connection between said lugs and having loops formed within their lengths; guard springs between said loops and having bent portions for engagement with said loops; and auxiliary springs secured to said lugs and having portions for engagement with said loops; substantially as described.

In testimony whereof I have signed my name to this specification in the presence of two subscribing witnesses.

JAMES M. MILLER.

Witnesses:
ELIZABETH GARBE,
CHAS. E. POTTS.